US006056512A

United States Patent [19]

[11] Patent Number: 6,056,512
[45] Date of Patent: May 2, 2000

Amberg et al.

[54] DEVICE FOR METERING OUT PASTES, IN PARTICULAR WASHING-AGENT PASTES

[75] Inventors: Guenther Amberg, Neuss; Wolfgang Huber, Fridolfing, both of Germany

[73] Assignee: Henkel-Ecolab GmbH & Co. OHG, Duesseldorf, Germany

[21] Appl. No.: 09/125,356

[22] PCT Filed: Feb. 10, 1997

[86] PCT No.: PCT/EP97/00604

§ 371 Date: Oct. 26, 1998

§ 102(e) Date: Oct. 26, 1998

[87] PCT Pub. No.: WO97/30203

PCT Pub. Date: Aug. 21, 1997

[30] Foreign Application Priority Data

Feb. 17, 1996 [DE] Germany ........................... 196 05 906

[51] Int. Cl.[7] ............................ F04B 23/08; G01F 11/42

[52] U.S. Cl. ............................................ 417/205; 222/309

[58] Field of Search ................................ 417/205, 87, 88; 222/309, 318, 334, 380

[56] References Cited

U.S. PATENT DOCUMENTS

| | | | |
|---|---|---|---|
| 4,317,530 | 3/1982 | Magrath | 222/309 |
| 5,011,045 | 4/1991 | Tammi | 222/318 |
| 5,301,847 | 4/1994 | Fehr et al. | 222/309 |

*Primary Examiner*—Mark Paschall
*Assistant Examiner*—Vinod D Patel
*Attorney, Agent, or Firm*—Wayne C. Jaeschke; Glenn E. J. Murphy; Kenneth Watov

[57] ABSTRACT

A device for metering out a paste-like material includes a connector for connecting the mouth of a flexible container to a positive-displacement pump, means for compressing, over a limited area, a bag filled with the paste so that the paste is acted on at this point by shear forces and at the same time squeezed towards the mouth of the bag. A suction pump is located behind the positive-displacement pump. The devices makes it possible to meter highly viscous pastes from flexible bags simply and without interruption, even when the paste includes trapped air.

9 Claims, 1 Drawing Sheet

DEVICE FOR METERING OUT PASTES, IN PARTICULAR WASHING-AGENT PASTES

BACKGROUND

1. Field of the Invention

This invention relates to a device for removing and dispensing pastes, particularly thixotropic pastes and preferably high-viscosity detergent pastes used in institutional laundries, from a flexible container provided with an opening.

2. Discussion of Related Art

Devices such as these are known, for example from DE 44 14 708 A1 or DE 44 16 089 A1. Under the effect a means for compressing the bag, for example, a roller moving down an inclined surface, the paste is forced from the containers through the opening into the feed line from which it is transported by a displacement pump, for example to a mixing chamber. In the case of detergent pastes, a stock liquor is prepared in the mixing chamber by the addition of water and can then be pumped without difficulty to the individual institutional washing machines.

However, air is unavoidably trapped in containers filled with highly viscous pastes during their production. The resulting air bubbles in the feed line lead to problems with the displacement pump and hence to an interruption in the dispensing process. These problems occur in particular with relatively old displacement pumps where the tolerances have increased through natural wear.

Dispensing problems even arise where displacement pumps capable of tolerating entrapped air are used. Although the dispensing process itself is not interrupted, its precision is affected.

Accordingly, the problem addressed by the present invention is to achieve uninterrupted precision dispensing in a device even when air is trapped in flexible containers filled with the pastes.

SUMMARY OF THE INVENTION

According to one embodiment of the invention, this problem is solved by providing a suction pump following the displacement pump. The inventors discovered that a correspondingly positioned suction pump is capable of sucking the air from the flexible bag through the displacement pump while it is running, so that a stream of paste free from air bubbles is delivered to the displacement pump.

In a preferred embodiment of the invention applicable in particular to a device for removing and dispensing detergent pastes, the suction pump is a jet pump with water as the driving medium. This type of suction pump affords advantages in terms of manufacturing and operating costs and space requirements. Also, the driving medium used may be employed for the necessary premixing of the pastes to form a stock liquor. Providing the water pressure and the nozzle cross-section are suitably selected, the throughput of water can be adjusted to correspond to the required concentration of the stock liquor. A nonreturn valve is preferably provided behind the injector.

The device according to the invention can be operated in a particularly problem-free manner if an outlet pipe is connected to the outlet of the jet pump and if its end on the jet pump side is directed upwards in operation. In this case, emptying of the jet pump after the device has been switched off is avoided so that, when the device is switched on again, the required suction pressure is immediately established without any need for additional measures.

The device according to the invention has proved to be particularly successful when the displacement pump is in the form of a screw pump, more particularly an eccentric screw pump. However, other displacement pumps may also be used in accordance with the invention.

BRIEF DESCRIPTION OF THE DRAWINGS

One example of an embodiment of the invention is described in detail in the following with reference to the accompanying drawings, in which like items are identified by the same reference designation, wherein.

DETAILED DESCRIPTION OF THE INVENTION

Figure 1:
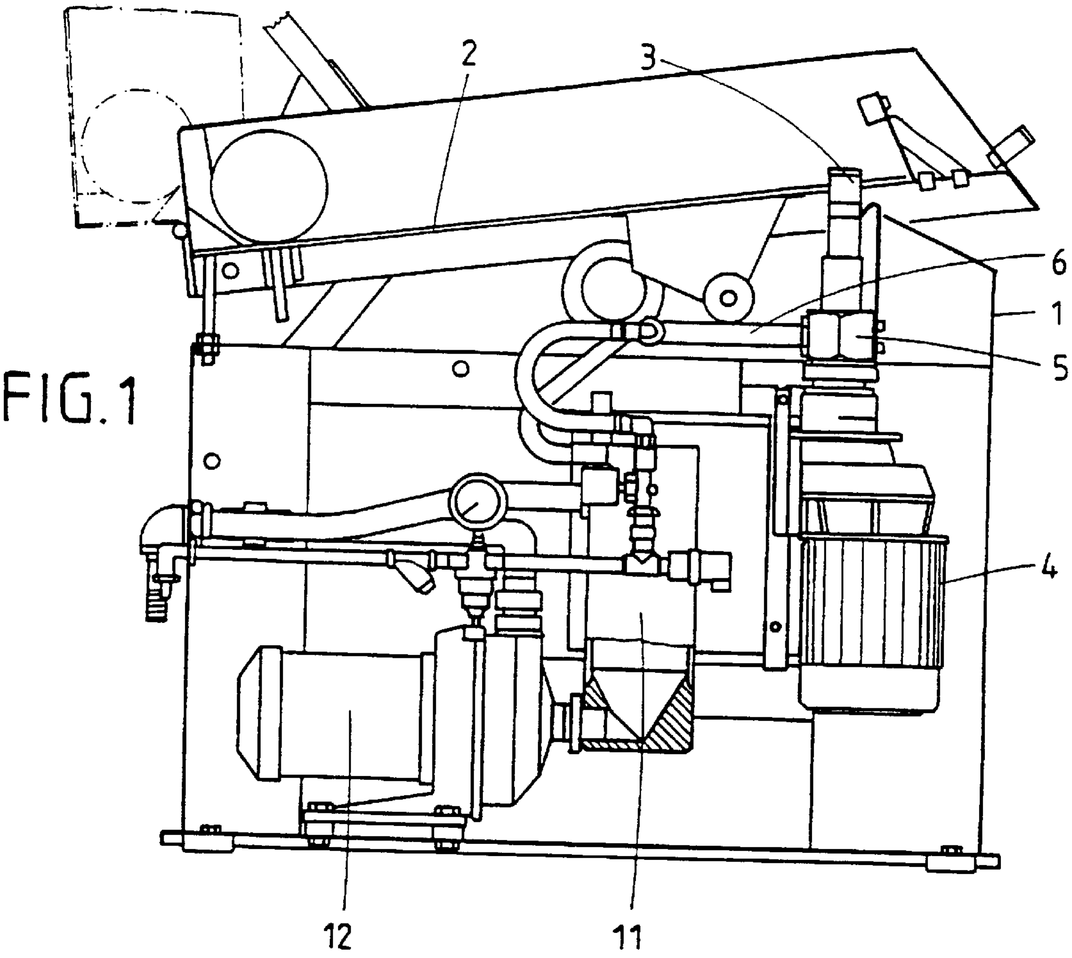
FIG. 1 is a schematic side elevation of the device.

The paste dispenser according to one embodiment of the invention comprises a rigid base frame 1. An inclined plane 2 provided in the upper region is displaceable relative to the base frame 1. A polyethylene bag filled with detergent paste is designed to be placed on the inclined plane 2. The connecting tube 3 of an eccentric screw pump 5 driven by the motor 4 projects into the opening of the bag. The screw pump 5, which forms the metering pump, forces the paste into an outlet pipe 6 at the end of which is arranged an injector (jet pump) 7 followed by a nonreturn valve. The injector 7 is driven by water from a feed line 8 with a water inflow valve 9. The water/paste mixture passes through a hose 10 to the mixing chamber 11 where it is mixed with more water—as known from DE 44 14 708 A1—to form a stock liquor which is then pumped by the pump 12 to the individual institutional washing machines. The details of the dispenser, except for the section between the eccentric screw pump 5 and the mixing chamber 11, are fully disclosed in DE 44 14 708 A1 and will not be repeated here. For the purposes of disclosure, reference is specifically made to this document of which the contents are incorporated by reference in the disclosure of the present application.

Figure 2:
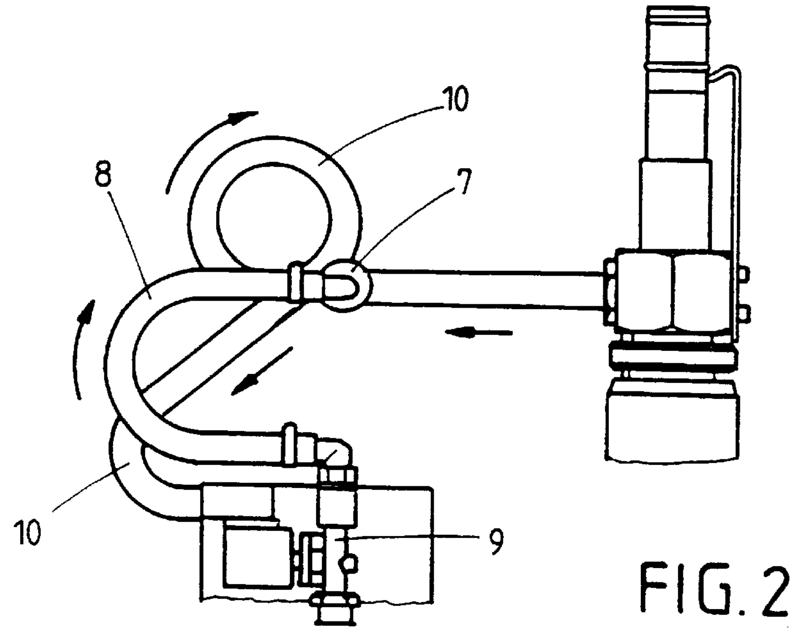
FIG. 2 shows the outlet end of the displacement pump on a larger scale.

Immediately after its connection to the injector 7, the hose 10 forms a loop so that the end of the hose 10 connected to the injector 7 is directed upwards thereby avoiding emptying of the injector in the event of a break in operation. In the interest of clarity, arrows are shown in FIG. 2 to indicate the direction of flow.

List of Reference Numerals

1 Base frame
2 Inclined plane
3 Connecting tube
4 Motor
5 Eccentric screw pump
6 Outlet pipe
7 Injector, jet pump
8 Feed line
9 Water inflow valve
10 Hose
11 Mixing chamber
12 Pump

What is claimed is:

1. A device for removing and dispensing pastes, particularly thixotropic pastes and preferably high-viscosity detergent pastes used in institutional laundries, from a flexible bag provided with an opening, comprising a connection for the opening to a displacement pump, and means for compressing the bag over a limited area and towards the opening so that shear forces act on the pastes in this zone and, at the same time, the paste is transported towards the opening, said device further including a suction pump following the displacement pump.

2. A device as claimed in claim 1, wherein the suction pump is in the form of a jet pump with water as the driving medium.

3. A device as claimed in claim 2, further including an outlet pipe connected to an outlet of the jet pump, with an end of said outlet pipe on the jet pump side being directed upwards in operation.

4. A device as claimed in claim 1, wherein the displacement pump is in the form of a screw pump.

5. A device as claimed in claim 1, wherein said displacement pump consists of an eccentric screw pump.

6. A device as claimed in claim 2, wherein the displacement pump is in the form of a screw pump.

7. A device as claimed in claim 2, wherein said displacement pump consists of an eccentric screw pump.

8. A device as claimed in claim 3, wherein the displacement pump is in the form of a screw pump.

9. A device as claimed in claim 3, wherein said displacement pump consists of an eccentric screw pump.

* * * * *